United States Patent [19]
DeBiasse

[11] 3,839,996
[45] Oct. 8, 1974

[54] INTERNAL COMBUSTION ENGINE WITH CLOSED CRANKCASE AND INTAKE VALVE COVER OPERATING UNDER VACUUM

[75] Inventor: Richard L. DeBiasse, Madison, N.J.

[73] Assignee: Automotive Engineering Research, Inc., Madison, N.J.

[22] Filed: May 4, 1973

[21] Appl. No.: 357,101

Related U.S. Application Data

[63] Continuation of Ser. No. 63,743, Aug. 14, 1970.

[52] U.S. Cl............... 123/119 B, 92/182, 92/193, 123/1, 123/195, 277/148, 277/165
[51] Int. Cl........................................... F02m 25/06
[58] Field of Search......... 123/119 B, 41.86, 195 R, 123/1; 92/198, 200, 204, 207, 193, 182; 277/141, 148, 165, 195

[56] References Cited
UNITED STATES PATENTS

| | | | |
|---|---|---|---|
| 1,229,258 | 6/1917 | Hass................... | 92/193 X |
| 1,411,343 | 4/1922 | Gore.................. | 123/119 B |
| 1,415,060 | 5/1922 | Kinner................ | 123/119 R |
| 1,427,337 | 8/1922 | Tracy................. | 123/119 B |
| 1,868,075 | 7/1932 | Reiland et al......... | 92/193 |
| 2,009,958 | 7/1935 | Hance................. | 92/200 |
| 2,386,765 | 10/1945 | Adams et al........... | 123/119 B |
| 2,696,414 | 12/1954 | Green................. | 277/148 |
| 3,068,018 | 12/1962 | Tydeman.............. | 277/193 X |
| 3,139,080 | 6/1964 | McMahon.............. | 123/119 B |
| 3,166,061 | 1/1965 | Weiser................ | 123/119 B |
| 3,343,844 | 9/1967 | Leschisin............. | 277/165 |
| 3,362,386 | 1/1968 | McMahon.............. | 123/119 B |
| 3,583,293 | 6/1971 | DeBiasse.............. | 92/182 |

FOREIGN PATENTS OR APPLICATIONS

| | | | |
|---|---|---|---|
| 736,062 | 8/1955 | Great Britain......... | 277/141 |
| 481,856 | 3/1039 | France................ | 277/165 |

*Primary Examiner*—Wendell E. Burns
*Attorney, Agent, or Firm*—Brumbaugh, Graves, Donohue & Raymond

[57] ABSTRACT

The crankcase and intake valve cover of a piston-type internal combustion engine are closed and sealed to hold a vacuum and are connected to the engine intake system at a point downstream from the air intake control element. In operation the crankcase and valve cover run under a vacuum approximating that of the intake manifold. This minimizes (1) the gas pressure differential between the crankcase and combustion chamber on the intake stroke of each cycle tending to cause oil to be sucked into the combustion chamber, and (2) the possibility of emission of crankcase fumes.

7 Claims, 2 Drawing Figures

PATENTED OCT 8 1974

3,839,996

INVENTOR.
RICHARD L. DeBIASSE
BY
Brumbaugh, Graves, Donohue & Raymond
his ATTORNEYS.

INTERNAL COMBUSTION ENGINE WITH CLOSED CRANKCASE AND INTAKE VALVE COVER OPERATING UNDER VACUUM

This is a continuation, of U.S. Pat. application Ser. No. 63,743 filed Aug. 14, 1970.

BACKGROUND OF THE INVENTION

This invention relates to internal combustion engines and, more particularly, to improvements in the crankcase, intake valve corner and intake manifold system that afford reduction in oil consumption (all other things being equal) and in emission of pollutants by the engine.

Almost universally, the sealing arrangement between each piston and companion cylinder wall of a piston-type internal combustion engine comprises one, and usually two, compression rings of the usual split-type and an oil control ring, also of the split-type, mounted in spaced-apart relation in separate ringlands formed in the piston. Although this conventional arrangement usually provides reasonably effective prevention of the passage of oil from below the piston into the combustion chamber of the engine, the end gaps between the ends of each of the three split rings affords a path of communication for gases between the combustion chamber on the crankcase, such leakage commonly being referred to in the industry as "blow-by." The blow-by gases, which are the hot products of combustion of the fuel-air mixture produced in the cylinder on the power stroke, leak into the crankcase.

Until a relatively few years ago, blow-by gases were vented from the crankcase directly to the air through a crankcase breather and were a very significant source of emission of pollutants into the atmosphere. A few years ago, systems were adopted by manufacturers and users of internal combustion engines for drawing the blow-by gases from the crankcase and delivering them back into the engine intake. This system is commonly called a PCV ("positive crankcase ventilation)" system. Various specific PCV systems have been proposed and adopted, but common to all of them is the venting of the crankcase to the atmosphere and the connection of the crankcase to the engine-intake so that blow-by gases are drawn, under the influence of the intake manifold vacuum, from the crankcase and delivered back to the cylinder in admixture with the fuel-air mixture by which the engine is powered.

In my prior U.S. Pat. application Ser. No. 790,301 filed on Jan. 10, 1969, for Piston-Rod Device and Components Thereof, now U.S. Pat. No. 3,583,293 issued June 8, 1971, I have described and illustrated, inter alia, a novel and improved single ringland piston-to-cylinder seal embodying a single stepped ringland that receives a split compression ring in a relatively deeper recess portion of the ringland and a split oil control ring in a relatively shallower recess portion of the land below the compression ring. To a degree, the two rings operate independently, and yet their operation is to some extent equivalent to that of a single ring. Rather than describe here the details of the construction and mode of operation of my single ringland seal arrangement, reference may be made to the application.

One extremely important advantage of my single ringland seal is that the friction drag between the rings and the cylinder wall can be reduced to a fraction, usually on the order of one-fifth, of the friction drag encountered with the conventional three-ring seal. Whereas conventional three-ring arrangements require a large ring to wall sealing force, and generate frictional forces on the order of fifty pounds for a four inch diameter piston simply to keep a moving piston moving along the cylinder, the single ringland arrangement operates very effectively under conditions according to which the compression ring is pressed against the wall with a relatively low force. The force may be such as to generate a moving frictional force of only about 7 to 10 pounds. Break away forces are slightly higher with both conventional and single ringland arrangements. Quite obviously, the reduction in friction forces between the rings and the cylinder walls contributes to a significant increase in effective power output in an engine, because a portion of the power generated by each acting cylinder of an engine, as the cylinders operate in sequence, is consumed in keeping all of the pistons of the engine moving up and down in all cylinders of the engine.

My single ringland arrangment also considerably reduces engine wear. With a three ring system, the cylinder wall tends to develop ripples due to the relative movements of the rings as they traverse different portions of the wall, in conjunction with the slight rocking of the piston and ring assembly in operation. Moreover, the relatively heavy loading of the compression rings in a conventional three ring arrangement, coupled with the possibility that the top compression ring does not receive as much lubrication as the second ring, contributes to high cylinder wear and uneven wear. In contrast, the single ringland arrangement does not produce ripples in the wall, and by virtue of the relatively light pressure of the rings against the cylinder wall and effective lubrication of the ring system due to the characteristics of the ringland configuration, wear is materially reduced. Developmental and test work involving the single ringland arrangement indicates that rings made of relatively inexpensive material, as contrasted to chrome-plated steel rings conventionally used, may be used without prematurely wearing out.

Finally, the single ringland system has been found to almost completely eliminate blow-by. While a conventional three ring system, by virtue primarily of the end gaps between the ends of the split rings, affords blow-by at a rate of on the order of 20percent, measurements indicate that the single ringland system results in a blow-by of about 2 percent or less. The compression ring and oil ring are in essentially face-to-face engagement, except for the presence of a thin oil film between them. Consequently, even though each ring has an end gap, there is no passage for gases from the combustion chamber to flow through from the gap in the compression ring to the gap in the oil sealing ring. Moreover, the compression ring, during the combustion stroke, is seated on the lower edge of the ringland and precludes leakage of gases behind the ring.

Thus, the advantages of my single ringland piston-to-cylinder seal arrangement, as described and and illustrated in my aforementioned patent application, are of considerable significance. First, the effectiveness of the seal against blow-by of the hot gases of combustion generated in the cylinder increases useful oil life by very nearly eliminating contamination of the crankcase oil by the combustion gases. Moreover, operating efficiency with a given fuel is enhanced, inasmuch as blow-by gases are limited and are not, therefore, mixed with the incoming fuel-air mixture delivered to the cylinder, as they are with the usual PCV system and three-ring seal. The effectiveness of the single ringland seal in providing adequate lubrication without undue losses of lubricant through leakage past the rings has also been experienced under normal running conditions. The increase in effective horsepower output of an engine due to elimination of power losses in providing the forces required to keep the pistons moving in the cylinders is a significant benefit of the reduced friction drag of the rings against the cylinder walls.

SUMMARY OF THE INVENTION

It has been found, quite unexpectedly, that additional advantages may be derived from the single ringland arrangement of my prior U.S. Pat. application Ser. No. 790,301, or for that matter any form of highly effective piston-to-cylinder wall seal, by establishing, substantially, a balance of pressure between the intake manifold, the crankcase and the intake valve cover of an internal combustion engine. Thus, according to the invention, a piston-type internal combustion engine comprises a highly effective seal between each piston and the wall of each cylinder, a crankcase chamber that is substantially completely sealed against communication with the atmosphere so that it will hold a vacuum, a valve cover chamber that also is substantially completely sealed against communication with the atmosphere so that it will hold a vacuum, and means for communicating the crankcase and valve cover chambers with the engine intake system at a point downstream from the air intake control element.

By closing off the crankcase and valve cover compartments or chambers and communicating them with the engine intake system, the pressures in the crankcase and the intake valve cover chambers are maintained in substantial balance at a level approximating the engine intake vacuum. In a conventional automobile engine, the communication is obtained, for example, by providing a conduit coupling the intake manifold and a valve cover chamber of the engine, with the conventional holes for the passage of lubricating oil, in turn, communicating the valve cover chamber with the crankcase. If two valve cover chambers are provided, such is commonly found in the V type of engine, the other valve cover chamber communicates with the crankcase through its respective oil lubrication passageways, and through the crankcase, with the first valve cover chamber.

The invention further embodies, as a safety feature, a one-way valve in the communicating system upstream from the engine intake to preclude fluid flow from the engine intake to the crankcase while affording fluid flow from the crankcase to the intake. Preferably, the one-way valve is biased to a closed position so that the absolute pressure in the crankcase is held slightly above, say about 1 to 3 inches Hg. above, the absolute pressure in the intake when the engine operating conditions are stabilized.

The invention provides all of the advantages of positive crankcase ventilation systems of the type presently known and used in that any blow-by gases are kept in closed circuit within the engine and are delivered back to the cylinders. In combination with effective piston seals with the cylinder walls, however, significantly improved combustion efficiency, by virtue of the absence of contamination of the fuel-air mixture with combustion gases, is obtained.

More importantly, the elimination of a differential pressure between the combustion chamber of each cylinder, on the one hand, and the crankcase and intake valve cover chambers on the other hand, is believed to reduce and even substantially eliminate the tendency for lubricating oil to be sucked in through any possible leakage points, particularly including the oil bearings which communicate with the combustion chamber, such as those which are nominally sealed by the valve seals, and the piston-to-cylinder wall seals. The usual situation in conventional engines is that on each intake stroke of each piston, the combustion chamber of each cylinder reaches a relatively high vacuum, whereas the crankcase and valve cover chambers are at substantially atmospheric pressure. Even though the intake valve cover is closed and sealed, the various oil drainage holes from the valve cover chamber to the crankcase provide ready communication of atmospheric pressure from a ventilated crankcase into the valve cover. The resultant differential pressure across the piston seals and the valve stem guides causes significant amounts of lubricating oil to be drawn into the cylinders. This pressure differential, the resulting oil leakage, and the effects of such oil leakage and burning, are eliminated by the system according to the invention.

The construction and mode of operation of the system, according to the invention, makes the term "vacuum balance system" quite apt to describe the system generally, the hereinafter this term will be used from time to time in referring to the system in general.

Another aspect of the invention involves an improved expander element for urging the compression ring of a single ringland arrangement of my prior application outwardly into engagement with the cylinder wall with a predetermined force. The expander element also enhances the seal. In particular, a ring of an elastomeric material is installed in the ringland in the portion behind the compression ring, the elastomeric ring having a dimension, as related to the relative diametral dimensions of the portion of the ringland groove where it is seated and the internal face of the ring, such that the elastomeric properties of the elastomeric ring provide a predetermined outward force on the ring. As mentioned previously, this force should be such as to provide a minimum of outward force on the compression ring so that the friction drag between the cylinder wall and the compression ring is maintained at a value not substantially in excess of about ten pounds for a four inch diameter piston and a proportional force for pistons of other sizes.

DESCRIPTION OF THE DRAWINGS

For a better understanding of the invention, reference may be made to the following description of an exemplary embodiment, taken in conjunction with the figures of the accompanying drawings, in which.

DESCRIPTION OF EXEMPLARY EMBODIMENT

Figure 1:
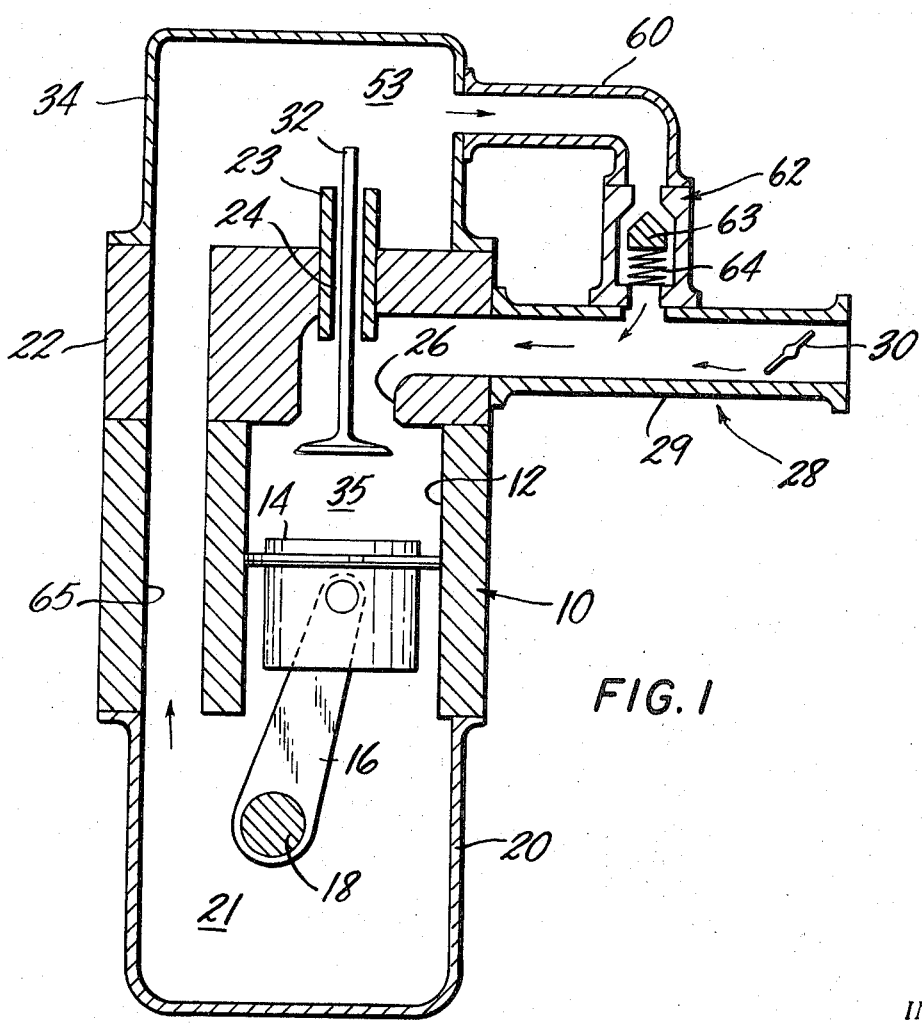
FIG. 1 is a cross-sectional view in generally schematic form of a typical internal combustion engine provided with a vacuum balance system.

In FIG. 1 of the drawings, the reference numeral 10 designates generally the block of an internal combustion engine which is formed with one or more cylinders 12, each of which receives a reciprocating piston 14. The piston is connected by a connecting rod 16 to a crank shaft 18, the crank shaft being disposed within a chamber 21 below the engine block 10 enclosed by a crankcase 20. The crankcase serves as bottom closure for the block 10 as well as a reservoir for the engine lubricating oil. A head 22 is mounted on the block and is provided with a multiplicity of valve guides 23, each of which receives a valve. An engine, of course, has an intake valve and an exhaust valve for each cylinder. In the schematic illustration of FIG. 1, however, only a representative intake valve 24 is illustrated, the valve 24 serving to selectively close and open an intake port 26 that is communicated with an intake system 28. In the usual multi-cylinder engine, the intake system 28 embodies a manifold for conducting fuel or air mixture from a carburetor, having an air intake control element. The intake system 28 is represented schematically as a manifold 29 that is equipped with a butterfly valve 30. The portion above the head 22 of a conventional engine into which the stems 32 of the valves 24 extend is covered by a valve cover 34.

Quite obviously, the details of the various components of an internal combustion engine, as described thus far, vary widely from one engine to another. Such details are well known in those skilled in the art, and there is no need to describe them here. The vacuum balance system according to the invention, is applicable to engines of a wide variety of designs; to provide a specific description of any specific engine would clearly be uninstructive, as well as unnecessary.

Figure 2:
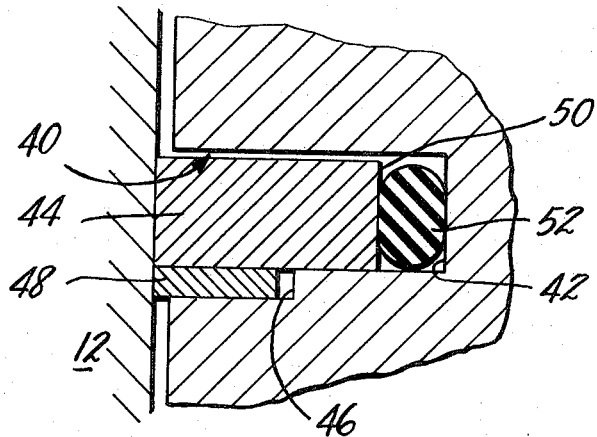
FIG. 2 is a detailed view of cross section of a segment of a piston and coacting cylinder having a single ringland seal arrangement of the type according to my prior application (referred to above) improved by installing an elastomeric ring behind the compression ring.

An important aspect of the invention, however, is that the seal between each piston 14 and its cylinder 12 be highly effective against allowing blow-by of the combustion gases from the combustion chamber above the piston 35 into the crankcase chamber 21 below the piston. Such a highly effective seal is described and illustrated in my U.S. Pat. application Ser. No. 790,301. FIG. 2 of the accompanying drawing illustrates a modified and improved version of that seal, which can be and is herein referred to as a single ringland seal. In FIG. 2 the reference numeral 40 designates generally the single ringland which is composed of two portions, a relatively deeper portion 42 that receives a split resilient compression ring 44 and a relatively shallower portion 46 that receives a split resilient oil scraper ring 48. The two groove portions 42 and 44 render the ringland 40 of step configuration in radial cross-section. The construction and mode of operation of these components of the single ringland seal are fully described in the aforementioned application, and reference may be made to that application for such description and accompanying illustrations.

According to the improvement, a combination seal-expander, which is designated by the reference numeral 52, is provided in the relatively deeper portion 42 of the ringland 40 behind and in engagement with the inside face 50 of the compression ring 44. The seal-expander is a ring of a suitable elastomeric material and is preferably of circular cross section when in relaxed condition. A highly advantageous material for the O-ring 52 is an elastomer known for its high durability and resistance to high temperatures sold under the trademark "Vitron" by the Goodyear Tire & Rubber Company. The composition of "Viton" is understood to be a trade secret, but it is believed to be a form of synthetic copolymer of the butadiene-styrene type.

The diameter or other cross-sectional dimensioning of the O-ring 52 in a direction radial to the axis of the piston, i.e., its dimension measured in the direction from the back face 50 of the compression ring 44 to the opposing base surface of the deeper portion 42 of the ringland 40, is so related to the characteristics of the elastomeric material of which the O-ring is manufactured as to provide a predetermined outward urging force on the split compression ring, thereby to obtain a ring-to-cylinder force appropriate to prevent the ring from being urged out of contact with the cylinder wall by hydrostatic pressure, differential gas pressure or other effective forces that tend to separate it from the cylinder wall. In general, it has been found that the ring should be forced into engagement with the cylinder wall with a force such that the frictional force generated between the ring and the cylinder wall is on the order of 10 pounds for a 4 inch diameter cylinder, and proportional for other ring cylinders. It appears however, that such force will vary depending on a number of factors, including cylinder diameter, compression ratio, and desired lubricating characteristics, as may be established by operating conditions. There appears to be no procedure for establishing a proper force relationship for a particular engine design except for experimentation with various dimensions.

The O-ring seal-expander 52 not only urges the compression ring into sealing engagement with the cylinder wall with a predetermined force, but also enhances the seal of the single ringland system by providing a further impediment (in addition to the compression and oil seal rings) to the flow of fluids between the combustion chamber of each cylinder and the crankcase chamber of the engine. The seal is less expensive and appears to be more reliable than a metallic spring, the operation of which can be effected by many factors, including for example, the accumulation of carbon deposits and deterioration of the material.

Referring back to FIG. 1 of the drawing, the vacuum balance system, according to the invention, involves establishing a substantial balance of pressure between the engine intake system 28 downstream from the air intake control element 30 (e.g., the butterfly of the carburetor), the valve cover chamber 53 defined within the valve cover 34, and the crankcase chamber 21 defined within the crankcase 20. Such balanced pressure condition is established, first, by closing off substantially all communication from the valve cover and crankcase chambers to the atmosphere. To this end, suitable gaskets (not shown) are provided (1) between the crankcase and the engine block and (2) between the valve cover and the engine head. The usual crankcase breather can be completely eliminated, and the engine oil filler tube is provided with a sealing cap of suitable form, various types which are known to those skilled in the art. Similarly, the engine oil dip-stick should also be sealed, such as by providing a suitable elastomeric gasket on the dip-stick and a companion seat on the tube on which the dip-stick is mounted. Any other substantial openings in the crankcase should also be appropriately closed, such as by removable closures or by eliminating them altogether. Ordinarily, the valve cover is essentially closed in a conventional engine, and no special provision need be made for making it gas tight to make it suitable for utilization with the vacuum balance system.

The second expedient necessary to establish a balanced pressure condition is to provide communication between the crankcase chamber 21, the valve cover chamber 53 and the intake system 28. As is well known to a person skilled in the art, the intake system or manifold is normally operating under a vacuum which is generated by the intake stroke of each piston in combination with the restricted air inlet, as provided by the air inlet control 30. Due to the communication provided according to the invention, the crankcase and valve cover chambers are at a vacuum that is generally related to this intake system vacuum, subject to a time lag, however, as operating conditions change within the engine between the intake vacuum, on the one hand, and the valve cover and crankcase chambers, on the other hand.

Communication between the crankcase and valve cover is already present in the usual internal combustion engine, such as through oil drain holes leading from the valve cover chamber to the crankcase to allow lubricating oil to drain back from the valve cover into the crankcase. In some instances, such valve cover drainage holes will suffice to provide adequate communication between the crankcase chamber and the valve cover chamber. However, it will usually be advisable to provide enlarged oil drain holes or separate breather conduits to provide adequate communication.

Communication from the valve cover chamber to the intake is accomplished by installing a conduit or pipe, which may be termed a balance tube, between the valve cover chamber and the intake system. In FIG. 1, the balance tube is designated by the reference numeral 60. Any appropriate form of rigid or flexible tubing suitably connected to the valve cover and to a suitable point in the engine intake system may be utilized and the details of such arrangements can readily be devised by those skilled in the art without any description here.

In the system depicted in FIG. 1 as described above, the crankcase is communicated to the engine intake system by a communication path that includes the balance tube 60, but it is readily apparent that separate paths of communication can be employed, if appropriate or necessary. An advantage of using a common path of communication is the elimination of additional conduit and connections between the crankcase and intake.

As a safety feature, the path of communication between the engine intake system, on the one hand, and the valve cover chamber and crankcase chamber, on the other hand, should include a one-way valve to preclude reverse fluid flow from the engine intake system into the respective chambers. In normal operation of an engine with a vacuum balance system according to the invention, the vacuum existing at any given moment in the valve cover chamber and crankcase chambers may be below the vacuum at the same moment in the engine intake system so that the differential pressure would result in the fuel-air mixture being drawn into the valve cover chamber and crankcase.

In the illustrated version, a one-way valve 62 having a plunger 63 which is biased upwardly by a spring 64 is installed in the balance tube 60. As illustrated schematically, the valve allows communication from the valve cover 53 to the intake system 28 but precludes communication from the intake system to the valve cover. Inasmuch as the illustrated version embodies a path of communication from the crankcase chamber to the valve cover chamber via an internal passage 65, which may be the oil drain openings as described above, the single one-way valve 62 in the balance tube 60 prevents back-communication from the intake system 28 to both the valve cover and the crankcase. If separate paths of communication are employed, then two one-way valves, one for each path, would be provided.

All reference herein to a balanced pressure in the crankcase, valve cover and intake system is made in contemplation that in actual practice the absolute pressures in the crankcase and valve cover may be two or three inches of mercury above the absolute pressure existing in the intake system at the same time by reason of the valve 62. Moreover, the system will inherently involve some lag between the pressure at a given moment in the intake system and the pressures at the same moment, in the valve cover chamber 53 and in the crankcase chamber 21. Consequently, the term "vacuum balance," as modified by the word "substantially," is intended to take into account the time lag and the moderate differentials just described.

The operation of an engine equipped with the vacuum balance system, according to the invention, is essentially as follows. The engine intake system is normally under a vacuum on the order of about 15 inches Hg. to as much as 28 or 29 inches Hg., i.e., from about 15 inches Hg. absolute down to 2 to 1 inches Hg. absolute. In this regard, it has been found that the highly effective piston seal, together with the substantial isolation of the combustion chamber from atmospheric pressure, by reason of vacuum in the valve cover and crankcase chambers, enables a higher intake vacuum to be achieved in a vacuum balance system engine than in a conventional engine. The particular intake vacuum at any given time depends, of course, on the mode of operation, in which the engine may be accelerating, deaccelerating, idling, running at high speeds or low speeds, etc. It takes several seconds, after start-up for the valve cover and crankcase chambers to reach a vacuum level approaching that of the intake vacuum, and a similar time lag of several seconds is involved in all modes of operation. The highest degree of vacuum, that is the lowest absolute pressure, in the intake system is normally obtained under conditions when the engine is not under power but is under conditions of braking or backing-off. During the braking condition of operation, the butterfly or other air intake control element is closed and, in essence, the engine is acting as a vacuum pump by drawing air on each intake cycle of each piston and exhausting that air through the exhaust valve in the exhaust system on each exhaust cycle. In this mode, relatively high vacuums (low absolute pressures) are developed in the crankcase and valve cover chambers, since after the brief time lag, the pressure conditions in the intake system, in the combustion chambers during the intake stroke of the corresponding piston, and in the valve cover and crankcase chambers are substantially equalized, except for the two or three inch differential referred to previously. Similarly, under normal running conditions in which the butterfly or other intake control element is partially open, a relatively moderate vacuum exists in the intake, and substantially corresponding vacuums are developed in the valve cover and crankcase chambers.

It seems unnecessary to elaborate further on different modes of engine operation beyond those presented above. It suffices to say that the system provides for a floating vacuum condition in the valve cover and crankcase chamber such that the absolute pressures in these chambers are maintained in substantial balance with the vacuum intake system downstream from the air intake control element of the engine. The intake vacuum closely corresponds to the vacuum developed in each combustion chamber on the intake stroke of the piston serving that combustion chamber. Accordingly, under most operating conditions, except for transitional periods, the differential pressures across (1) the piston seal with the cylinder wall and (2) the valve stem and associated seal to the end that are developed in the direction tending to draw lubricating oil into the combustion chamber are significantly reduced. Consequently, oil consumption is reduced, the combustion chamber is subject to a minimum build-up of sludge deposits, and the tendency for fouling plugs is reduced; in other words, the engine runs cleaner. Moreover, engine efficiency is enhanced by the absence of dilution of the fuel-air mixture in the cylinder with leakage oil. Furthermore, it has been found that the completely closed engine system materially reduces oil contamination and the tendency for blockage of the valve used in the conventional positive crankcase ventilation (PCV) system. The conventional PCV systems depend on circulating atmospheric air, such air often being laden with dust, and moisture continuously into the crankcase and through the PCV control valve. This contaminated incoming air can significantly contaminate the engine oil, and can frequently precipitate blockage of the PCV valve to prevent effective operation of the PCV system. If this occurs, the crankcase actually tends to operate under pressure above atmospheric with the result that blow-by gases are once again expelled to the atmosphere as they were in engines not equipped with PCV.

On the contrary, the vacuum balance system according to the invention provides a minimum circulation of gases into the crankcase and through the one-way valve to virtually eliminate the possibility of blockage of the valve and effective operation of the system.

An unexpected advantage of the system according to the invention has been that the moisture level in the oil has been found to be substantially reduced. Although the reasons for the reduction are not as yet completely understood, it is expected that lowering surface pressures to which the oil is subjected greatly increases the rate of evaporation of moisture from the oil. The system is also relatively easy to test for effective operation using a simple pressure gage which can be connected to the oil filler port, for example, to ascertain whether, with the engine running, the crankcase is operating at a vacuum.

In summary, the invention provides more effective pollution control than conventional PCV systems. It also increases engine efficiency and power output, reduces oil consumption, provides cleaner running and longer spark plug life and affords the various other manifest advantages associated with the minimization of oil leakage into the cylinder and actual pumping of contaminated atmospheric air through the crankcase and into the engine. In conjunction with the utilization of the single ringland piston-to-cylinder seal, the invention provides higher power output, cleaner running, reduced maintenance requirements and higher efficiency of utilization of fuel input.

The above-described embodiment of the invention is intended to be merely exemplary, and those skilled in the art will be able to make numerous variations and modifications of it without departing from the spirit and scope of the invention. All such variations and modifications are intended to be included within the scope of the invention, as defined in the appended claims.

I claim:

1. In an internal combustion engine having a combustion chamber with a piston reciprocally movable therein, a crankcase chamber, and an engine intake system connected to said combustion chamber and including an air intake control element therein, the improvement of apparatus comprising means sealing the crankcase chamber substantially completely against communication with the atmosphere so that it will hold a vacuum, means providing substantially unrestricted communication from the crankcase chamber to the engine intake system at a location in the intake system downstream from the air intake control element, relative to the direction of flow of air through the intake system, substantially to balance the pressures in the intake system and the crankcase at a level approximating engine intake vacuum, and piston ring means for sealing the circumference of the piston with the wall of the combustion chamber and restricting blowby from the combustion chamber to the crankcase to an amount less than the capacity of the said means for maintaining communication to maintain a substantial balance between the crankcase and intake system absolute pressures.

2. The apparatus according to claim 1, and further comprising a one-way valve in the means communicating the crankcase chamber with the engine intake system, said valve being arranged to preclude fluid flow from the engine intake system to the crankcase chamber while affording fluid flow from the crankcase chamber to the engine intake.

3. The apparatus according to claim 1, wherein said engine includes an intake valve cover and further comprising means sealing the intake valve cover chamber substantially completely against communication with the atmosphere so that it will hold a vacuum, and wherein the means providing communication includes conduit means connected between the intake valve cover chamber and the engine intake system at a point downstream from the air intake control element.

4. The apparatus according to claim 3, and further comprising a one-way valve in the conduit means, said valve being arranged to preclude fluid flow from the intake system to the valve cover chamber while affording fluid flow from the valve cover chamber to the intake system.

5. The apparatus according to claim 1, wherein said piston ring means is effective to reduce blowby to less than 2 per cent, by weight, of the mass drawn into the combustion chamber through the engine intake system.

6. The apparatus according to claim 1 wherein the piston ring means comprises a single ringland formed in the piston, said ringland including a first portion of a first depth and a second portion of another depth different from the first, a split compression ring and a split oil scraper ring received in said ringland and an annular elastomeric combined sealing and expanding element received in the ringland behind the compression ring, the elastomeric sealing element being under compression between the ringland and the compression ring and urging the compression ring radially outward and forming a seal between the compression ring and the ringland.

7. The apparatus according to claim 1 wherein the piston has a single ringland including a first portion of one depth and a second portion of another depth, thereby rendering said ringland of stepped configuration in radial cross section and wherein said piston ring means includes a pair of combination rings received in the ringland, one ring being received in the first portion thereof and the other ring in the second portion thereof, and an elastomeric combined sealing and expanding ring received in the ringland behind one of said rings.

* * * * *